United States Patent [19]

Rosin et al.

[11] Patent Number: 5,439,864
[45] Date of Patent: Aug. 8, 1995

[54] SHAPED CARBONACEOUS COMPOSITION

[75] Inventors: Richard R. Rosin, Riverside; Steven A. Bradley, Arlington Heights, both of Ill.

[73] Assignee: UOP, Des Plaines, Ill.

[21] Appl. No.: 172,980

[22] Filed: Dec. 27, 1993

[51] Int. Cl.⁶ .......................... B01J 21/18; B01J 20/20
[52] U.S. Cl. .................................. 502/180; 502/418;
  502/423; 502/426; 502/437; 423/449.9;
  423/450
[58] Field of Search .............. 502/416, 417, 437, 462,
  502/415, 413, 180, 418, 423, 426; 423/449.91,
  450

[56] References Cited

U.S. PATENT DOCUMENTS

| | | | |
|---|---|---|---|
| 2,620,314 | 12/1952 | Hoekstra | 252/448 |
| 4,263,268 | 4/1981 | Knox et al. | 502/415 |
| 4,329,260 | 5/1982 | Lester et al. | 252/446 |
| 4,380,679 | 4/1983 | Arena | 568/863 |
| 4,471,072 | 9/1984 | Leyerle et al. | 502/416 |
| 4,499,201 | 2/1985 | Leyerle | 502/180 |
| 4,849,112 | 7/1989 | Barder et al. | 210/674 |
| 4,997,804 | 3/1991 | Pekala | 502/418 |
| 5,040,551 | 8/1991 | Schlatter et al. | 44/542 |

*Primary Examiner*—Anthony McFarlane
*Attorney, Agent, or Firm*—Thomas K. McBride; Eugene I. Snyder; Frank S. Molinaro

[57] ABSTRACT

This invention relates to a shaped composition composed of a carbonaceous pyropolymer having recurring units containing at least carbon and hydrogen atoms. The composition is characterized by a crush strength of at least 6 kg and has a bimodal pore distribution having maxima at pore diameters of about 60 to 900 Å and about 120 to 160 Å.

6 Claims, No Drawings

SHAPED CARBONACEOUS COMPOSITION

FIELD OF THE INVENTION

This invention relates to a shaped composition composed of a carbonaceous pyropolymer. It is characterized by a crush strength of at least 6 kg and has a bimodal pore distribution having maxima at pore diameters of about 60 to 90,!, and about 120 to 160 Å.

BACKGROUND OF THE INVENTION

Carbonaceous materials are well known and are useful as supports for various catalytic metals. When used as a support these carbonaceous supports are usually in the shape of spheres, plates, pellets, rods, fibers, with spheres being preferred. For example, U.S. Pat. No. 4,471,072 discloses a process for preparing a carbonaceous pyropolymer on a solid support. That is, a carbonaceous material is deposited on a solid support and takes the shape of the solid support.

Further, U.S. Pat. No. 4,329,260 discloses a carbonaceous composition which is prepared by pyrolyzing a hydrocarbon onto a solid support followed by leaching of the support. The composition is identified as a shaped replication support and is stated to have an Apparent Bulk Density (ABD) of about 25 to about 100% of the support and a crush strength of about 0.5 to about 14 kg.

Finally, U.S. Pat. No. 4,499,201 discloses a process for removing the alumina substrate from a carbonaceous pyropolymer which has been deposited on the substrate. This process uses a chloride containing compound at elevated temperatures to remove the alumina substrate.

Applicants have prepared a carbonaceous support which differs from the carbonaceous materials disclosed in the prior art. The instant composition is characterized in that substantially all of its pores have diameters that are less than about 300 Å. The pore size distribution is described by a bi-modal distribution curve, i.e., a curve having two distinct maxima, in which the maxima occur at average diameters of about 60 to 90 Å and about 120 to 160 Å. These compositions also have a crush strength of at least 6 kg.

The carbonaceous pyropolymer compositions of this invention are prepared by pyrolyzing a hydrocarbon such as toluene onto a substrate such as spherical alumina. Next the alumina is leached away using an acid such as sulfuric acid. Finally, at least one more layer of carbonaceous pyropolymer is deposited onto the leached carbonaceous composition by pyrolyzing a hydrocarbon onto the leached composition to give the finished carbonaceous composition.

SUMMARY OF THE INVENTION

As stated this invention relates to a novel composition. Accordingly, one embodiment of the invention is a shaped composition comprising a carbonaceous pyropolymer having recurring units containing at least carbon and hydrogen atoms and characterized in that said composition has a crush strength of at least 6 kg, has pores whose pore diameters are less than about 300 Å and the pore diameters are described by a bimodal distribution curve having maxima at average diameters of about 60–90 Å and about 120 to 160 Å.

This and other objects and embodiments will become more apparent in the following detailed description of the invention.

DETAILED DESCRIPTION OF THE INVENTION

As stated, this invention relates to a shaped composition comprising a carbonaceous pyropolymer having recurring units containing at least carbon and hydrogen atoms. These materials are prepared by depositing a pyropolymer precursor onto a refractory inorganic oxide support and then polymerizing said precursor. Thus one necessary component of this invention is on inorganic oxide support or substrate. Illustrative of the oxides which can be used are alumina such as gamma-alumina, eta-alumina, theta-alumina, and alpha-alumina. The shape of the refractory inorganic oxide substrate may be any of a variety of shapes such as spheres, plates, pellets, rods, fibers, etc., with spheres being preferred. These shapes can be formed by means well known in the art such as marumerizing, pelletizing, nodulizing, etc. The refractory inorganic oxide substrate usually has a surface area of about 100 to about 250 $m^2/g$ as well as a pore structure.

A particularly preferred substrate is a gamma-alumina spherical substrate prepared by the well known oil drop method which is described in U.S. Pat. No. 2,620,314 which is incorporated by reference. The oil drop method comprises forming an aluminum hydrosol by any of the techniques taught in the art and preferably by reacting aluminum metal with hydrochloric acid; combining the hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and ammoniacal solution to further improve their physical characteristics. The resulting aged and gelled spheres are then washed and dried at a relatively low temperature of about 80°–150° C. and subjected to a calcination procedure at a temperature of about 455°–705° C. for a period of about 1 to about 20 hours. The treatment effects conversion of the hydrogel to the corresponding crystalline gamma-alumina.

The shaped refractory inorganic oxide is now heated under an inert atmosphere up to a temperature of about 400° to about 1200° C. The inert atmosphere can be a nitrogen, helium or argon atmosphere. Once the spherical support has reached the desired temperature, a pyropolymer precursor is introduced and is deposited onto the support. The pyropolymer precursors which can be used include but are not limited to aliphatic hydrocarbons, aromatic hydrocarbons, alicyclic hydrocarbons, and mixtures thereof. Specific examples include ethane, propane, butane, pentane, 1-butene, 2-butene, 1-pentene, 1-butyne, 2-butyne, 1-pentyne, 1-hexyne, 1,3-butadiene, benzene, toluene, cyclohexane, and propylene. The amount of pyropolymer precursor which is flowed over the spherical support is that amount necessary to give from about 10 to about 50 weight percent carbon on the support.

As stated, the pyropolymer precursor (for example, toluene) is deposited onto the shaped support and then maintained at the desired temperature for a time sufficient to pyrolyze the precursor. Generally this time is from about 1 to about 6 hours. The resultant coating is a carbonaceous pyropolymer which has recurring units containing at least carbon and hydrogen atoms.

The carbonaceous coated spherical support is now treated to leach out the inorganic oxide support. This is accomplished by mixing the carbonaceous coated spherical support with an inorganic acid at a temperature of about 100° to about 250° C. for a period of time from about 1 hour to about 72 hours. It is to be understood that the operating parameters of the leaching step will vary over a wide range and will depend on a combination of time, temperature and strength of the leaching solution. Examples of inorganic acid which can be used include but are not limited to phosphoric acid, sulfuric acid, nitric acid and hydrochloric acid with sulfuric acid being preferred.

The resultant carbonaceous pyropolymer composition which has recurring units containing at least carbon and hydrogen atoms is now heated to a temperature of about 450° to about 900° C. in an inert atmosphere. A pyropolymer precursor as described above is now deposited onto the carbonaceous composition in order to deposit a second layer of carbonaceous pyropolymer onto the shaped carbonaceous composition. The effect of depositing additional layers (one, two or more layers) of carbonaceous pyropolymer is that the crush strength is increased and the pore diameters are decreased. Accordingly, a variety of compositions can be obtained with different crush strengths and pore diameters. The final shaped carbonaceous pyropolymer is characterized in that it has pores substantially all of which have pore diameters less than about 300 Å. Further, the composition has a bimodal pore distribution having maxima at about 60 to 90 Å and 120 to 160 Å. The larger pore maxima is derived from the original substrate, while the smaller maxima is a result of the method used to prepare the composition. Other characteristics of the composition include a crush strength of at least 6 kg, an Apparent Bulk Density (ABD) of about 0.4 to about 0.7 and a surface area of at least 150 m$^2$/g.

The carbonaceous composition may be used as is as an adsorbent, conductive substrate or it may be used as a support for catalytic metals such as one or more of the Group VIII metals which include iron, nickel, platinum, palladium, rhodium, ruthenium, etc. Procedures for depositing metals on supports are well known in the art. The following examples are presented in illustration of this invention and are not intended as undue limitations on the generally broad scope of the invention as set out in the appended claims.

EXAMPLE 1

Alumina spheres prepared by the oil drop method were obtained from UOP and identified as SAB-2L. This material was heated in a furnace to a temperature of 816° C. at which point toluene was fed into the furnace at a rate of 1.25 grams toluene per gram of support per hour and the toluene was fed for a total of 5 hours. This resulted in a carbonaceous pyropolymer (40 wt % carbon) being deposited onto the gamma alumina spheres. These carbonaceous coated spheres had the following properties.

| | |
|---|---|
| Average Bulk Density | 0.86 gm/cc |
| Piece Crush Strength | 15 kg |
| Surface Area | 68 m$^2$/gm |
| Pore Volume | 0.32 cc/gm |
| Average Pore Diameter | 190Å |
| % C | 40% |

EXAMPLE 2

The carbonaceous pyropolymer coated spheres of Example 1 were now contacted with 60 wt. % sulfuric acid at 135° C. for 96 hours. This dissolved the alumina and resulted in a carbonaceous pyropolymer support having the following properties.

| | |
|---|---|
| Average Bulk Density | 0.42 gm/cc |
| Piece Crush Strength | 6 kg |
| Surface Area | 361 m$^2$/gm |
| Pore Volume | 1.19 cc/gm |
| Bi-Modal Distribution | |
| Smaller Diameter | 90Å |
| Larger Diameter | 160Å |
| % Al | .027 |

EXAMPLE 3

Additional layers of carbonaceous pyropolymer were deposited onto the carbonaceous support of Example 2 by using the procedure set forth in Example 1.

| | No. of Additional Layers | | |
|---|---|---|---|
| Property | 1 | 2 | 3 |
| Average Bulk Density (gm/cc) | N/A | N/A | 0.70 |
| Piece Crush Strength (kg) | 7 | 8.6 | 10 |
| Surface Area (m$^2$/gm) | 224 | 184 | 152 |
| Pore Volume (cc/gm) | .69 | .54 | .43 |
| Bi-Modal Distribution | | | |
| Smaller Diameter (A) | 70 | 60 | 60 |
| Larger Diameter (A) | 142 | 120 | 120 |

The above data indicate that as more layers of carbonaceous pyropolymer are added, the crush strength increases and the pore diameter decreases.

We claim as our invention:

1. A shaped composition comprising a carbonaceous pyropolymer having recurring units containing at least carbon and hydrogen atoms and characterized in that said composition has a crush strength of at least 6 kg, has pores whose pore diameters are less than about 300 Å and the pore diameters are described by a bimodal distribution curve having maxima at average diameters of about 60 to 90 Å and about 120 to 160 Å.

2. The composition of claim 1 further characterized in that the composition has a crush strength of at least 10 kg.

3. The composition of claim 1 further characterized in that the composition has an Apparent Bulk Density of about 0.42 to about 0.70 g/cc.

4. The composition of claim 1 further characterized in that the composition has a surface area of at least 150 m$^2$/g.

5. The composition of claim 1 characterized in that said composition is in the shape of spheres, plates, pellets, rods or fibers.

6. The composition of claim 5 where the composition has a spherical shape.

* * * * *